UNITED STATES PATENT OFFICE.

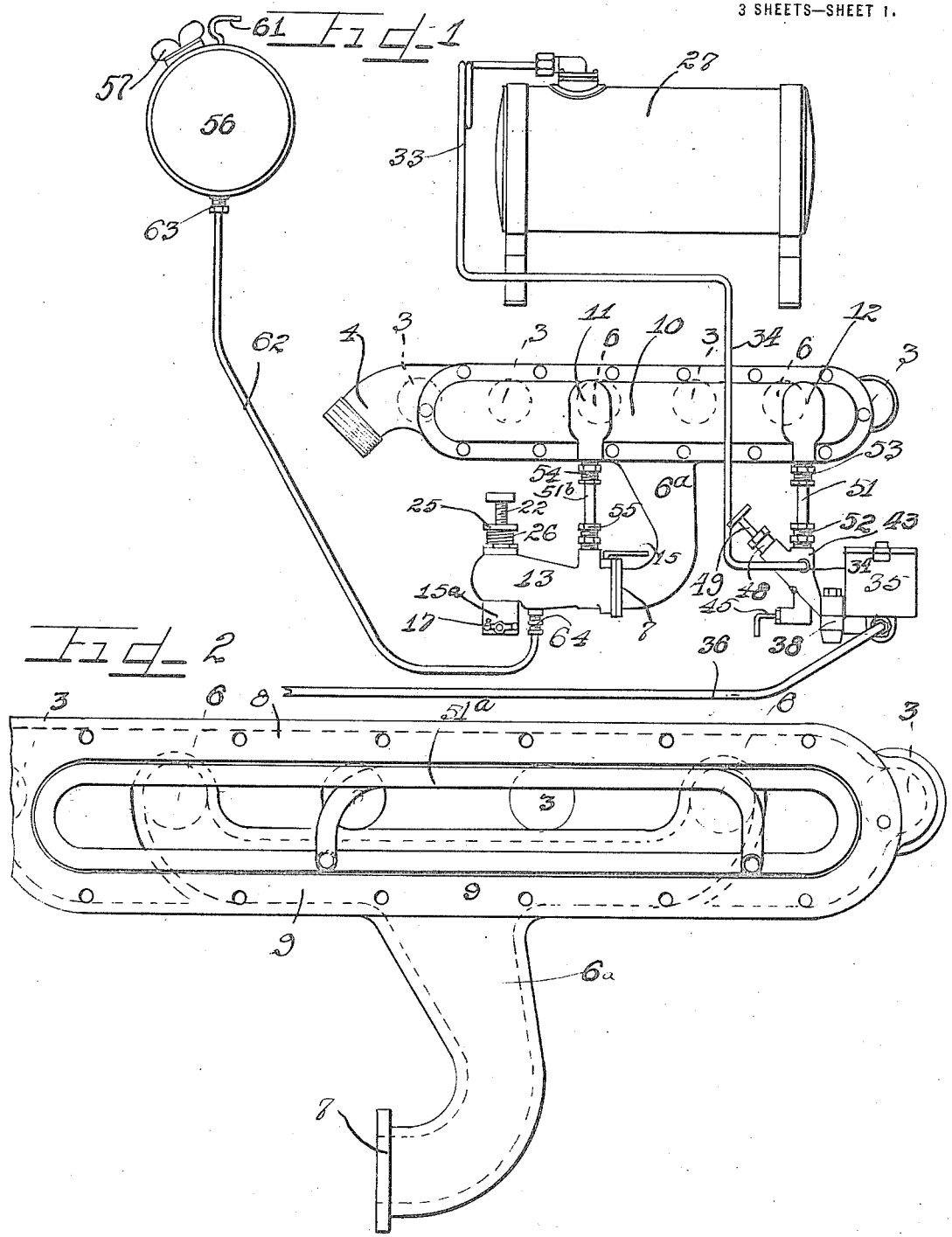

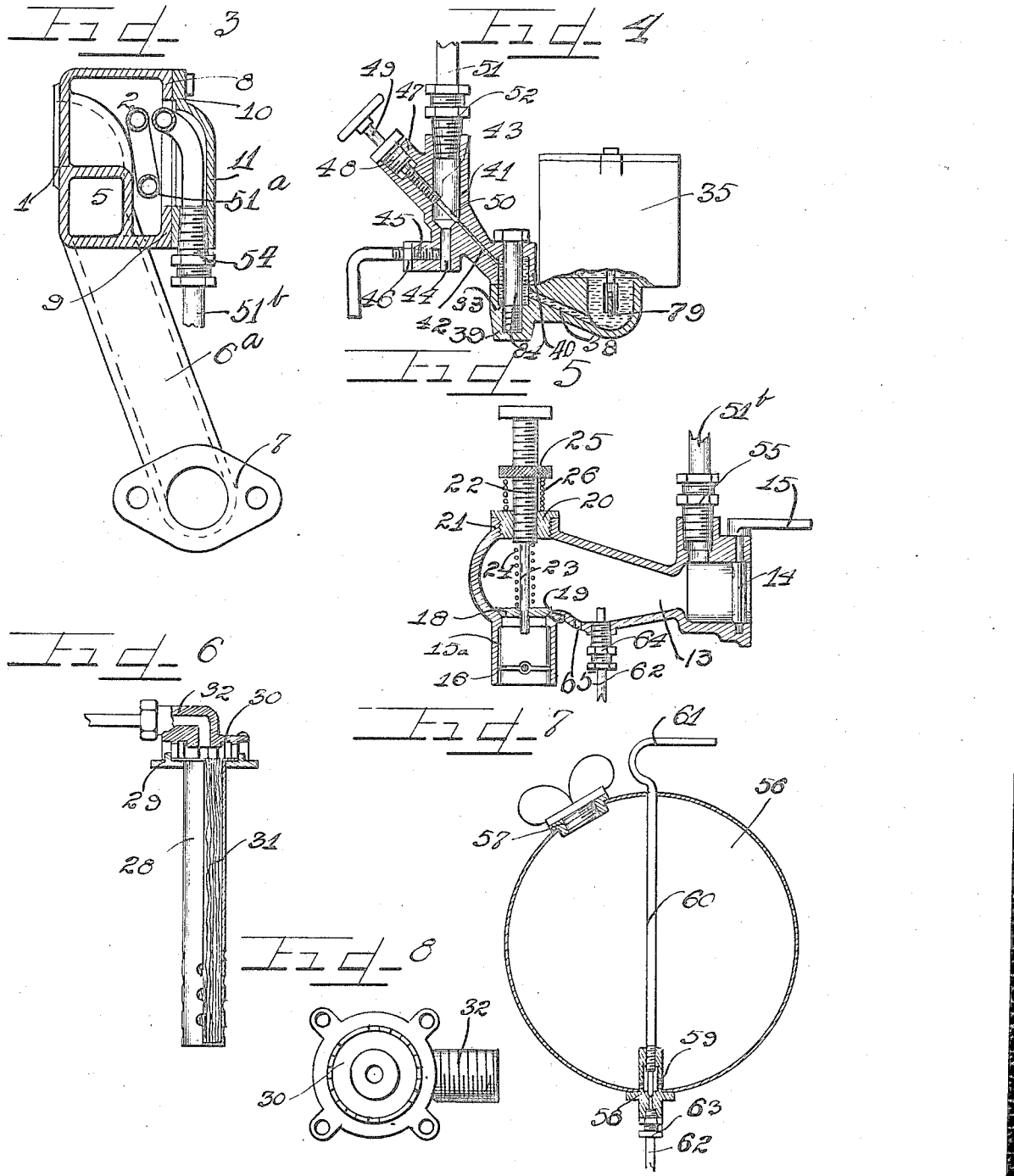

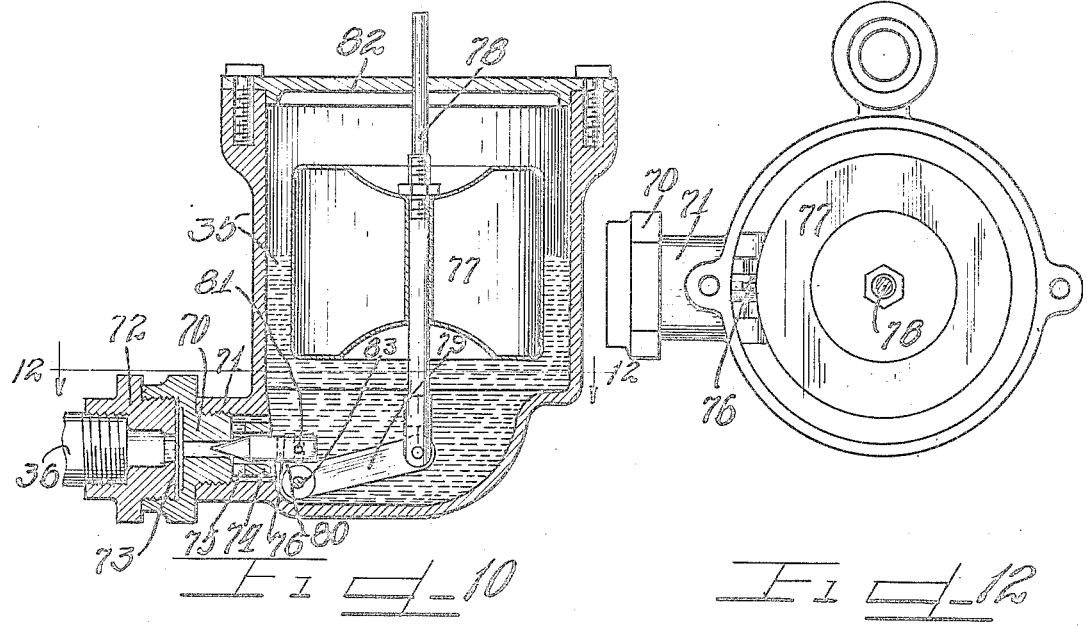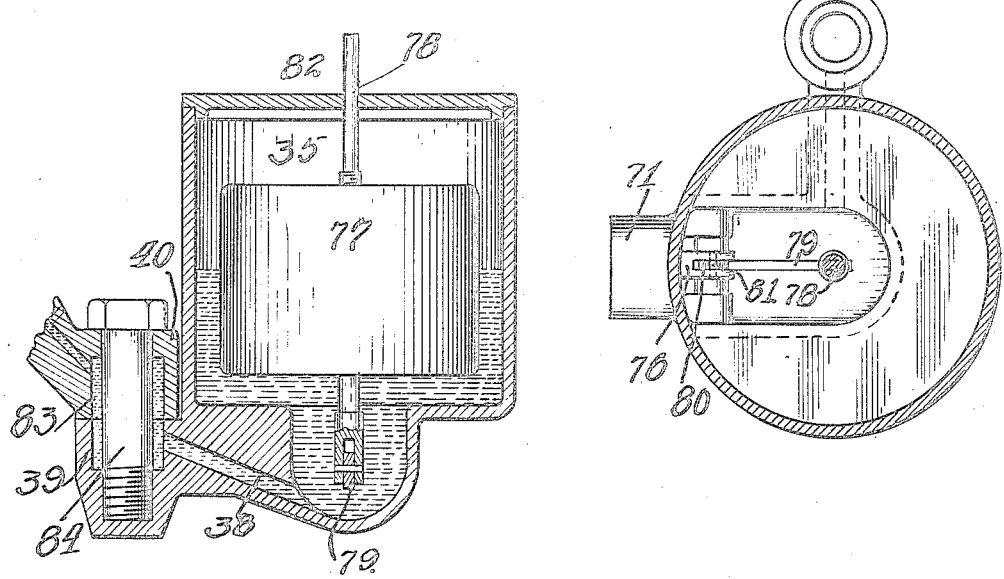

JOHN W. DUNTLEY, OF CHICAGO, ILLINOIS.

HYDROPNEUMATIC GAS GENERATOR.

1,424,160.      Specification of Letters Patent.      Patented Aug. 1, 1922.

Application filed October 10, 1917. Serial No. 195,870.

*To all whom it may concern:*

Be it known that I, JOHN W. DUNTLEY, a citizen of the United States, and a resident of the city of Chicago, in the county of Cook and State of Illinois, have invented certain new and useful Improvements in a Hydropneumatic Gas Generator; and I do hereby declare that the following is a full, clear, and exact description of the same, reference being had to the accompanying drawings and to the numerals of reference marked thereon, which form a part of this specification.

Heretofore, in motor vehicles the fuel generally used for the internal combustion engine has been a mixture of gasoline and air. Owing to the great demand for gasoline, the quality is becoming very inferior, partly through adulteration at the source of production, and partly because of the further adulteration by dealers who seek a profit thereby, although exacting full price as gasoline. It has consequently become more and more expensive to operate gasoline engines of all kinds, and the carbureting devices heretofore used are not giving satisfactory results, inasmuch as the liquid fuel mixture now available under the name "gasoline" is much less volatile than true gasoline, and mileage per gallon of fuel has fallen off because of imperfect combustion.

It is an object of this invention to provide a device in which a cheap, low-grade fuel may be used, and with which (in some instances), a quantity of water or water vapor and air may be used in the combustible gas mixture within the cylinder, preventing depositing of carbon in the cylinders and on the valves and pistons of the engine.

It is further an object of this invention to provide a device of the class specified in which the hydro-carbon is heated to distillation and the vapor somewhat super-heated and then mixed with cold air (and water vapor, if desired), thereby adapting the heated gas to take up a maximum quantity of air (and water, if used) and providing a highly combustible and economical explosive mixture or gas for internal combustion engines.

It is further an object of this invention to provide a device in which a suitable priming fluid may be introduced as a rich mixture into the intake manifold of the engine to facilitate starting of the engine, and in which the same may be entirely cut out to permit the engine operating on the hydropneumatic gas thereafter generated.

It is further an object of this invention to provide a device of the class specified in which water vapor may be mixed with a quantity of air prior to the introduction of the highly heated hydro-carbon gas, and in which the elements are then combined and thoroughly mixed and raised to a high temperature in their passage to the engine cylinders.

It is further an object of this invention to provide a device in which combined elements forming a combustible gas are superheated to insure complete volatilization of the hydro-carbon constituents and then as they are being delivered to the intake ports of the engine, are mixed with a colder inflow of air to complete the mixture before admission into the cylinders.

Other and further important objects of this invention will be apparent from the disclosures in the specification and drawings.

The invention (in a preferred form) is illustrated in the drawings and hereinafter more fully described.

On the drawings:

Figure 1 is a side elevation of a device embodying my invention.

Figure 2 is a view of the combined generator and intake and exhaust manifold with the cover plate removed.

Figure 3 is a section taken through the same at the point of exit of the hydro-carbon gas pipe.

Figure 4 is an enlarged sectional view of the atomizer with the float chamber in elevation.

Figure 5 is an enlarged section of the first carbureting and mixing chamber.

Figure 6 is an enlarged detail of the water vaporizing device.

Figure 7 is an enlarged detail of the priming device.

Figure 8 is a bottom plan view of the valve for the water vaporizing device.

Figure 9 is a vertical section taken through the float chamber.

Figure 10 is a vertical section taken at right angles with Figure 9.

Figure 11 is a top plan view of the float valve chamber and float with the cover removed.

Figure 12 is a view taken on line 12—12 of Figure 9.

As shown in the drawings:

A manifold heater is provided which comprises a combined generator, intake and exhaust manifold. Said device comprises a casing 1, affording a generating chamber 2, into which the exhaust from the engine is delivered through the ports 3, which register with the exhaust ports of the engine when the manifold generator is attached thereto. The exhaust, after passing through the manifold generator chamber, is delivered through exhaust pipe 4, to the muffler (not shown). Said casing 1, is also provided with a chamber 5, for receiving the combustible mixture of fuel, and has inlet ports 6, which register with the inlet ports for the engine. Integral with the casing and communicating with the fuel chamber 5, is a pipe or connection 6ª, forming, together with said chamber, an auxiliary mixing chamber. This is provided with a flange 7, for purposes hereinafter set forth. The casing 1, is also provided with flanges 8—9, and a cover plate 10, secured to these flanges, is constructed to provide two passages 11—12, in the wall thereof, which open through said cover plate 10, the walls at the lower outer ends of the passages being internally threaded.

Rigidly secured to the flange 7, of the pipe 6ª is a carbureting and mixing device 13, which comprises a casing of suitable shape, in the outlet end of which a throttle valve 14, is journalled, provided with a lever 15, adapted for connection with a suitable operating means (not shown). An air inlet passage 15ª, is provided, in which an adjustable butterfly or other suitable valve 16, is provided, and a handle 17, is connected with said valve for setting the same in desired position. An automatic air valve 18, is provided, which seats on a valve seat 19, at the upper end of the air inlet passage 15ª. For the purpose of controlling the opening of said automatic valve, a cap 20, is threaded into a boss 21. Extending into the mixing chamber and threaded centrally through the cap 20, is a stem 22, provided with a guide stem 23, on which said valve 18, moves, and a spring 24, normally tends to hold the valve seated. For the purpose of locking the stem 22, from accidental adjustment, a collar 25, is threaded on the stem 22, and a lock spring 26, is interposed between the same and cap 20.

A hydro-carbon atomizer is provided, which comprises a float chamber 35, communicating with a hydro-carbon source of supply by means of a plug 70, having an axial passage therethrough, and threaded into a passage 71, opening into the float chamber near the bottom thereof, and an apertured plug 72, is threaded into plug 70, and into which the supply pipe 36, is threaded. Said plugs or fittings have a straining screen 73, interposed in the passage therethrough and between the plugs. The plug 70, has a cylindrical extension 74, of less diameter than the internal diameter of the boss 71, providing a passage therebetween, which communicates with the axial passage in the plugs by means of apertures 75. A needle valve 76, is provided, adapted to seat in the passage at the end of the plug 70, to control the supply of hydro-carbon fluid to the float chamber. A float 77, of spun copper or other suitable material is provided with a guide stem 78, extending axially therethrough. Pivotally connected to the lower end of the guide stem 78, is an arm 79, of a bell-crank lever, the other arm 80, of which, extends through a slot in the needle valve 76, and is forked to engage on each side of a pin 81, secured to the needle valve and extends through the slot therein. The bell crank lever is pivoted to the casing by means of a pin 83. A detachable cover plate 82, is secured to the float chamber, and is provided with an aperture through which the guide stem 78, engages.

A passage 38, is cored through the wall of the float chamber, and affords communication between the float chamber and cup-shaped member 39, which, together with the cup-shaped member 40, of the atomizing casing 41, forms a fuel chamber 83, from which a restricted passage 42, opens into the atomizing chamber 43, in casing 41. A bolt 84, extends through the members 39—40, and rigidly secures the float chamber 35, to the atomizing casing 41, but permits relative adjustment. An air inlet passage 44, opens from said chamber 43, to the atmosphere, the opening of said air inlet passage being controlled by a valve screw 45, on which a lock nut 46, is threaded.

Threaded into a boss 47, is a nut 48, through which is threaded a stem 49, which is shaped to afford a closure for the passage 42, forming a needle valve 50, for regulating the quantity of hydro-carbon fluid delivered into the atomizing chamber 43, through the passage 42. A pipe 51, communicates with the atomizing chamber 43, and is connected to the casing by means of a suitable fluid tight gland or connection 52. The opposite end of the pipe 51, connects through passage 12, in the cover 10, by suitable fittings, and communicates with a pipe 51ª, which coils around the exhaust chamber 2, providing a heating coil, and communicates through passage 11, and a suitable pipe 51ᵇ, and suitable fittings, into the mixing chamber 13, at the rear of the throttle valve 14. Connections 53—54—55, may be provided to insure air-tight joints for said pipe 51, passage 12, pipe 51ª, passage 11, and pipe 51ᵇ.

For the purpose of supplying a priming fluid to the engine in starting, a priming tank 56, is provided, which has a filling aperture closed by a plug 57. A valve casing 58, is secured in the bottom of the tank 56, provided with apertures 59, for the admission of fuel, and a needle valve 60, controls the outlet from said valve casing. Said needle valve has a handle 61, for manual actuation. Leading from the valve casing 58, is a supply pipe 62, which opens in the mixing chamber in advance of the air valve 18. Suitable fluid tight glands 63—64, are provided for said pipe, and an air aperture 65, opens into the mixing chamber 13, to supply air for the priming fluid when starting the engine.

A water supply tank 27, is provided, to which is secured a suitable water vaporizing device which, as shown, comprises a pipe or sleeve 28, flanged at its upper end to rest on the fitting 29, and apertured at its lower end to admit water thereinto. A member 30, is secured to the tank above the upper end of the sleeve 28, and provides a chamber, the walls being apertured to admit air into the chamber. Suitable material 31, such as wicking, is inserted in the sleeve and extends to the upper end of the pipe 28, adapted to deliver moisture through capillary attraction into said vaporizing chamber. An externally threaded boss 32, is integral with the member 30, and is provided with a passage communicating with said chamber. A water or vapor supply pipe 33, is connected at one end to the boss 32, and at its opposite end communicates with the chamber 43, above the needle valve 50, by means of the connector 34.

The operation is as follows:

In starting the engine, the needle valve 60, in the priming tank, is opened, which admits the high grade fuel, such as gasoline, into the primary mixing chamber 13, which, together with air through aperture 65, is admitted to the engine to afford the starting charges. After starting, the needle valve is closed, shutting off further supply of the priming fuel. In the meantime, the suction of the engine has drawn a quantity of low grade fuel from the atomizer, from whence, with some air drawn through the open port 44, it passes through the generating coils afforded by the pipe 51ª, in the exhaust chamber, and into the mixing chamber 13. As the hydro-carbon is passing through the generating coil, it is heated to the distillation point and completely volatilized, forming a gas. If water be used, the suction of the engine also draws a quantity of water vapor or moist air through pipe 33, into the mixing chamber, where it mixes with air and hydro-carbon and passes therewith through the generating coil and is broken up and assists in carburetion.

The hot product from the generating coil passes into the primary mixing chamber, and there receives a supply of colder air through the air valve 18, which cools the intensely heated gases from the generating coil somewhat, enabling a greater quantity of air to be used, and is thoroughly mixed, passing through mixing chamber or pipe 6ª, and is again heated to a high temperature and thoroughly mixed in chamber 5, and passes to the cylinders for use. By admitting cold air into the hot gas, the mixture will absorb a much larger quantity of air than where the air is admitted hot.

By the construction described, perfect combustion is attainable. Low grade fuel is successfully used, and provides a highly efficient combustible gas; in fact, affords greater efficiency than in the use of gasoline. Furthermore, the engine is kept free from carbon; in fact, in actual practice it has been found that previous carbon deposits were removed.

By adjusting the needle valve 50, of the atomizer, the amount of hydro-carbon admitted through the passage can be regulated to a nicety, and adjustment of valve 45, controls the amount of air admitted. The butterfly valve 16, may be adjusted to any open position, as conditions require, and by adjusting stem 22, the resistance offered against the opening of the automatic air valve can be nicely controlled.

I am aware that various details of construction may be varied through a wide range without departing from the principles of this invention, and I therefore do not desire limiting this application otherwise than necessitated by the prior art.

I claim as my invention:

1. In a device of the class described, a combined exhaust and intake manifold, an atomizer, a carbureting chamber, a pipe affording communication between the atomizer and carbureting chamber, said pipe having a part thereof disposed in the manifold, means for supplying mixed air and water vapor to the atomizer, an automatic air valve for said carbureting chamber, and means for connecting the carbureting chamber with the intake manifold.

2. In a device of the class described, a manifold containing exhaust and intake chambers, an atomizer, a mixing chamber communicating with the intake manifold, a throttle valve for the mixing chamber, a member heated by said manifold affording a communication between the atomizer and mixing chamber, a water tank, means associated with said tank for facilitating the evaporation of water, means for delivering the water vapor into the atomizer, and an air opening for said mixing chamber.

3. In a device of the class described, a manifold containing exhaust and intake chambers, an atomizer including a needle valve and an adjustable air inlet, a mixing chamber communicating with the intake manifold, a throttle valve for the mixing chamber, a member heated by said manifold affording communication between the atomizer and mixing chamber, a water tank, means associated with said tank for facilitating the evaporation of water, means for delivering the water vapor into the atomizer, an air opening for said mixing chamber, and an automatic valve for said air opening.

4. In a gas generator, a combined intake and exhaust manifold, a heating coil therein, a hydro-carbon atomizer communicating with the heating coil, a mixing chamber communicating with the heating coil, a water tank, a vaporizing device supplying moisture therefrom to the atomizer, an air inlet valve for the mixing chamber, and a throttle valve for the mixing chamber, the intake manifold being heated by the exhaust manifold and through which the combustible mixture passes prior to its delivery to an engine.

5. In a device of the class described, a manifold containing exhaust and intake chambers, an atomizer, a mixing chamber communicating with the intake chamber, a throttle valve for the mixing chamber, a member heated by said manifold affording communication between the atomizer and mixing chamber, a water tank, means associated with said tank for facilitating the evaporation of water, means for delivering the water vapor into the atomizer, an air opening for said mixing chamber, an automatic valve for said air opening, a priming tank, means affording communication between the same and the mixing chamber, and a valve controlling the delivery of priming fluid from the priming tank to the mixing chamber.

6. In a gas generator, a combined intake and exhaust manifold, a heating coil therein, a hydro-carbon atomizer communicating with the heating coil, said atomizer including a needle valve and an adjustable air inlet, a float chamber communicating with the hydro-carbon atomizer, a connection between said float chamber and said atomizer through which said communication is effected, said connection including two parts, and means for securing these parts together with any desired angle between them, a mixing chamber communicating with the heating coil, a water tank, a vaporizing device supplying moisture therefrom to the atomizer, an air inlet valve for the mixing chamber, and a throttle valve for the mixing chamber, the intake manifold being heated by the exhaust manifold and through which the combustible mixture passes prior to its delivery to an engine.

7. In a device of the class described, the combination with the exhaust manifold of an engine, of an intake manifold embraced thereby, a pipe extending through the exhause manifold to be heated thereby, a casing having a mixing chamber with which one end of the pipe is connected, an automatic air valve for the mixing chamber, a pipe leading from the mixing chamber to the intake manifold, another casing having an air passageway of a predetermined cross-section which remains constant irrespective of the suction exerted by the engine, said second casing discharging into the other end of said pipe, a fuel nozzle feeding into the air passageway, and means for manually regulating the capacity of the nozzle.

8. In a device of the class described, the combination with the exhaust manifold of an engine, of an intake manifold embraced thereby, a pipe extending through the exhaust manifold to be heated thereby, a casing having a mixing chamber with which one end of the pipe is connected, an automatic air valve for the mixing chamber, a pipe leading from the mixing chamber to the intake manifold, another casing having an air passageway of a predetermined cross-section which remains constant irrespective of the suction exerted by the engine, said second casing discharging into the other end of said pipe, a fuel nozzle feeding into the air passageway, means for manually regulating the capacity of the nozzle, and moisture supplying means communicating with said passageway.

In testimony whereof I have hereunto subscribed my name in the presence of two subscribing witnesses.

JOHN W. DUNTLEY.

Witnesses:
 ED L. KULICK,
 HARRY B. COLESTOCK.